US012353270B2

(12) United States Patent
Athalye

(10) Patent No.: US 12,353,270 B2
(45) Date of Patent: Jul. 8, 2025

(54) SYSTEM AND METHOD FOR ADAPTIVELY MANAGING SERVICES USING CIRCUIT BREAKER

(71) Applicant: Walmart Apollo, LLC, Bentonville, AR (US)

(72) Inventor: Aditya Ajay Athalye, Karnataka (IN)

(73) Assignee: Walmart Apollo, LLC, Bentonville, AR (US)

( * ) Notice: Subject to any disclaimer, the term of this patent is extended or adjusted under 35 U.S.C. 154(b) by 119 days.

(21) Appl. No.: 18/364,650

(22) Filed: Aug. 3, 2023

(65) Prior Publication Data

US 2025/0045135 A1 Feb. 6, 2025

(51) Int. Cl.
*G06F 11/07* (2006.01)

(52) U.S. Cl.
CPC ........ *G06F 11/076* (2013.01); *G06F 11/0709* (2013.01); *G06F 11/0793* (2013.01)

(58) Field of Classification Search
CPC . G06F 11/076; G06F 11/0709; G06F 11/0793
See application file for complete search history.

(56) References Cited

U.S. PATENT DOCUMENTS

| | | | |
|---|---|---|---|
| 11,080,174 B2 | 8/2021 | Bonas | |
| 11,563,636 B1 * | 1/2023 | Kairali | ................... H04L 67/562 |
| 2019/0095257 A1 * | 3/2019 | Bhatia | ................. G06F 11/0706 |
| 2019/0129813 A1 * | 5/2019 | Sankarasubramanian | .................... G06F 11/3409 |
| 2019/0250955 A1 * | 8/2019 | Sethi | ...................... G06F 9/5011 |
| 2021/0029210 A1 * | 1/2021 | Hulick, Jr. | ............ H04L 67/561 |
| 2023/0090079 A1 | 3/2023 | Bruno et al. | |
| 2023/0122000 A1 | 4/2023 | Vasametti et al. | |
| 2023/0297413 A1 * | 9/2023 | Polan | ..................... G06F 9/5055 718/100 |
| 2023/0308908 A1 * | 9/2023 | Rajput | .................... H04L 67/02 |
| 2024/0193026 A1 * | 6/2024 | Griffin | .................. G06F 11/076 |
| 2024/0378108 A1 * | 11/2024 | Averdunk | ........... G06F 11/0793 |

OTHER PUBLICATIONS

M. Bruce et al., "Microservices in Action," Chapter 6, (2018) 35 pages.

(Continued)

*Primary Examiner* — Kamini B Patel
(74) *Attorney, Agent, or Firm* — Morgan, Lewis & Bockius LLP; Manita Rawat

(57) ABSTRACT

Systems and methods for adaptively managing services using circuit breakers are disclosed. A disclosed method includes: measuring an integration reliability of interaction between a first service executed at a first device and a second service executed at a second device during a past time period, the first service being dependent on the second service for execution; determining an adaptive threshold for a circuit breaker regarding a first time period based on the integration reliability; and executing the first service based on a request within the first time period by calling the second service through the circuit breaker, wherein the circuit breaker trips to stop the calling of the second service when a failure rate of interaction between the first service and the second service in the first time period exceeds the adaptive threshold.

20 Claims, 11 Drawing Sheets

(56) References Cited

OTHER PUBLICATIONS

Amazon, "Deployment circuit breaker," Retrieved from Internet Apr. 28, 2023, 4 pages.
Y. Liu et al., "Risk assessment for the cascading failure of electric cyber-physical system considering multiple information factors," IET Cyber-Physical Systems: Theory & Applications, vol. 2, Issue 4, Sep. 26, 2017, 24 pages.
Lightbend Inc., "Akka Circuit Breaker," https://www.lightbend.com, Oct. 16, 2020, 3 pages.

* cited by examiner

SYSTEM AND METHOD FOR ADAPTIVELY MANAGING SERVICES USING CIRCUIT BREAKER

TECHNICAL FIELD

This application relates generally to service management and, more particularly, to systems and methods for adaptively managing services using circuit breakers.

BACKGROUND

Circuit breaker is a resiliency pattern used across the industry to ensure that a dependent service can insulate itself from failures of its dependency service while still being able to provide some level of degraded quality of service. For example, a circuit breaker in a microservice architecture can ensure that failures inside a dependency or downstream microservice do not adversely impact the dependent or upstream microservice, thereby insulating the dependent microservice from any undesired effects of such failures to prevent failures from cascading across a microservice chain.

Existing circuit breaker configurations for dependency calls are ad-hoc in nature. Most failure settings for circuit breakers are default values provided by libraries containing circuit breaker functionality, without giving any rationale. In addition, these default values are static and do not account for changing load patterns or variations in criticality of system integration throughout the day. Furthermore, there is no target metric to associate these circuit breaker configurations to verify their validity. This results in failure configurations which have no basis or method to measure their correctness, which causes dependency services to usually fail after much longer than they ought to, thereby having significant business or systematic impact.

SUMMARY

The embodiments described herein are directed to systems and methods for adaptively managing services using circuit breakers.

In various embodiments, a first computing device including a non-transitory memory configured to store instructions thereon and at least one processor is disclosed. The at least one processor is configured to read the instructions to: configure a circuit breaker between the first computing device and a second computing device, wherein the circuit breaker is configured based on: measuring an integration reliability of interaction between a first service executed at the first computing device and a second service executed at the second computing device during a past time period, wherein the first service is dependent on the second service for execution, and determining an adaptive threshold for the circuit breaker regarding a first time period based at least partially on the integration reliability; and execute the first service based on a request within the first time period by calling the second service at the second computing device through the circuit breaker, wherein the circuit breaker trips to stop the calling of the second service when a failure rate of interaction between the first service and the second service in the first time period exceeds the adaptive threshold.

In various embodiments, a method implemented on a first computing device is disclosed. The method includes: configuring a circuit breaker between the first computing device and a second computing device, wherein the configuring the circuit breaker comprises: measuring an integration reliability of interaction between a first service executed at the first computing device and a second service executed at the second computing device during a past time period, wherein the first service is dependent on the second service for execution, determining an adaptive threshold for the circuit breaker regarding a first time period based at least partially on the integration reliability; and executing the first service based on a request within the first time period by calling the second service at the second computing device through the circuit breaker, wherein the circuit breaker trips to stop the calling of the second service when a failure rate of interaction between the first service and the second service in the first time period exceeds the adaptive threshold.

In various embodiments, a system is disclosed. The system comprises: a first computing device configured to execute a first service; a second computing device configured to execute a second service; and a circuit breaker between the first computing device and the second computing device. The first service is dependent on the second service for execution. The first computing device is further configured to: configure the circuit breaker based on measuring an integration reliability of interaction between the first service and the second service during a past time period, and determining an adaptive threshold for the circuit breaker regarding a first time period based at least partially on the integration reliability; and execute the first service based on a request within the first time period by calling the second service at the second computing device through the circuit breaker. The circuit breaker is configured to trip to stop the calling of the second service when a failure rate of interaction between the first service and the second service in the first time period exceeds the adaptive threshold.

Other concepts relate to software and non-transitory computer readable medium for implementing the present teaching on service management. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
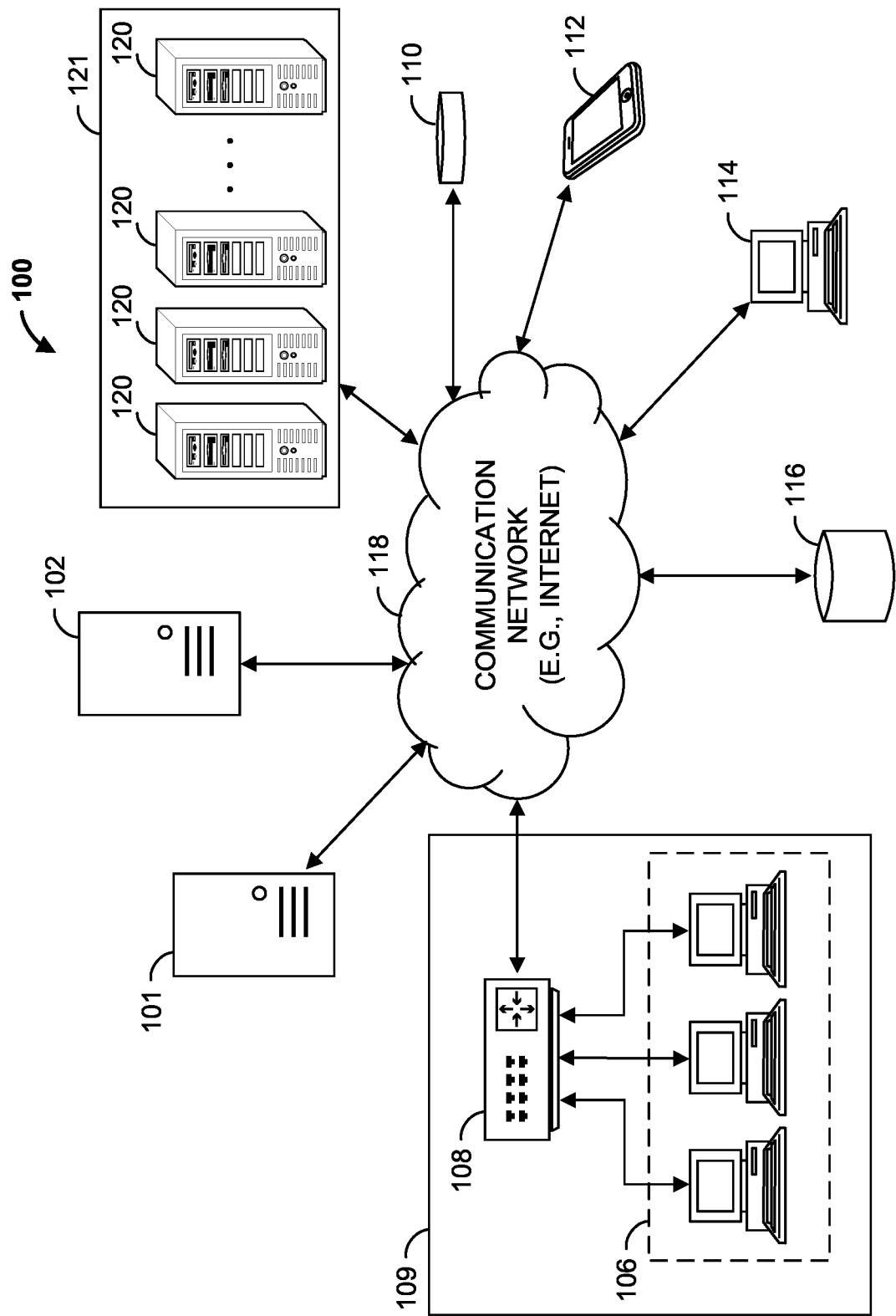
FIG. 1 is a network environment configured to adaptively manage services using circuit breakers, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

A circuit breaker controls a connection from a dependent system to a dependency system, and ensures that failures inside the dependency system do not adversely impact the dependent system. A dependent system may be any system that needs a network call to get some service or information from another system, which is called a dependency system with respect to the dependent system. The circuit breaker can also help shielding the dependency system by avoiding it from getting overwhelmed with calls coming from the dependent system, e.g. when the dependency system is going through a rough patch or is on the path to recovery.

Configuring a circuit breaker, e.g. with a failure threshold, is key to the performance of the dependent and dependency systems. On one hand, if the failure threshold is too high, the dependent system wastes precious system resources making calls to the dependency system instead of falling back, thereby affecting its own quality of service as well as overwhelming the dependency system. This also impacts business adversely as the dependent system starts degrading and impacting its service to users upstream. On the other hand, if the failure threshold is too low, the circuit breaker would end up tripping too often, causing undesired false alarms and potentially degraded experience.

One goal of various embodiments in the present teaching is to provide a rationale behind calculation of circuit breaker failure thresholds by associating them with a trackable metric called system integration reliability, e.g. by associating reliability of interaction between the dependency and dependent systems with an allowable threshold for interaction failures, which are in turn associated with the circuit breaker.

In some embodiments, a deterministic methodology is disclosed to compute a circuit breaker failure threshold by making it a function of reliability of the interaction between dependency and dependent systems. In general, a reliability of a software is a function of failures during a specified measurement period. The less the failures, the more the reliability of a software to perform its intended activity. Since circuit breakers are used to protect the dependent system from catastrophic failures in the dependency system, the circuit breakers are also closely related to system failures. This present teaching exploits this relationship between reliability and circuit breaker thresholds, and establishes a correlation which helps to derive a mathematical model which makes reliability a dependent variable of the circuit breaker failure threshold.

While software reliability can be modeled following multiple statistical models, various embodiments of the present teaching focus on the reliability of a systematic interaction and use an exponential distribution to represent probability of failure of the interaction. Since failure is an event, exponential distribution helps to represent a time when next failure is likely to occur. In addition, exponential distribution gives a memoryless property, since interaction call failures are not dependent on historical failures. An interaction would not fail because it failed in the past, thereby decoupling a past occurrence from any future failure.

In some embodiments, an exponential distribution function is used to model reliability and convert that into allowable failures to achieve a historical reliability or desired reliability score. A disclosed system can make use of component interaction reliability in the last T time units to predict the reliability in the next t time units, which gives a formula to determine tolerance of failures to achieve this reliability. This tolerance of failures can be used as the circuit breaker failure threshold.

In some embodiments, the failure threshold is computed as a function of reliability, number of calls made, and units of time measured, to configure a circuit breaker. In addition, the system can change this circuit breaker configuration based on differences in traffic pattern, thereby allowing thresholds to be set differently for different patterns of traffic, which can be implemented in an automatic manner using a pipeline.

Furthermore, in the following, various embodiments are described with respect to methods and systems for adaptively managing services using circuit breakers are disclosed. A disclosed method includes: measuring an integration reliability of interaction between a first service executed at a first device and a second service executed at a second device during a past time period, the first service being dependent on the second service for execution; determining an adaptive threshold for a circuit breaker regarding a first time period based on the integration reliability; and executing the first service based on a request within the first time period by calling the second service through the circuit breaker, wherein the circuit breaker trips to stop the calling of the second service when a failure rate of interaction between the first service and the second service in the first time period exceeds the adaptive threshold.

Turning to the drawings, FIG. 1 is a network environment 100 configured to adaptively manage services using circuit breakers, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a first service computing device 101, a second service computing device 102, a cloud-based engine 121 including one or more processing devices 120, workstation(s) 106, a database 116, and one or more customer computing devices 110, 112, 114 operatively coupled over the network 118. The first service computing device 101, the second service computing device 102, the workstation(s) 106, the processing device(s) 120, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some embodiments, the first service computing device 101 provides a service A that is dependent on another service B provided by the second service computing device 102. For example, the service A may call the service B for a parameter, a list, a message, or any other response to be used for the service A. In some examples, the first service computing device 101 is a web server providing web pages to online users, while the second service computing device 102 may be a search engine, a recommendation engine, an artificial intelligence (AI) engine, a ranking engine, an optimization engine, or any other device that can provide a service related to a web page provided by the web server. In these scenarios, the first service computing device 101 is a dependent system providing a dependent service A, while the second service computing device 102 is a dependency system providing a dependency service B. In some embodiments, a circuit breaker may be deployed between service A and service B, to control the calling from the service A to the service B. The circuit breaker may be part of the first service computing device 101, the second service computing device 102, or a third device connected to the network 118.

In some examples, each of the first service computing device 101, the second service computing device 102, and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the second service computing device 102. In some embodiments, the cloud-based engine 121 can serve as a dependency system for the second service computing device 102, e.g. by providing complicated computation services to the second service computing device 102.

In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the first service computing device 101 is a web server hosting one or more retailer websites. In some examples, the first service computing device 101, the processing devices 120, and/or the second service computing device 102 are operated by a retailer, and the multiple customer computing devices 110, 112, 114 are operated by customers of the retailer. In some examples, the processing devices 120 are operated by a third party (e.g., a cloud-computing provider).

The workstation(s) 106 are operably coupled to the communication network 118 via a router (or switch) 108. In some embodiments, the workstation(s) 106 and/or the router 108 may be located at a store 109 related to the retailer owning the first service computing device 101. The workstation(s) 106 can communicate with the second service computing device 102 over the communication network 118. The workstation(s) 106 may send data to, and receive data from, the first service computing device 101 and the second service computing device 102. The workstation(s) 106 may serve as either a dependency system or a dependent system for the first service computing device 101 and the second service computing device 102.

Although FIG. 1 illustrates three customer computing devices 110, 112, 114, the network environment 100 can include any number of customer computing devices 110, 112, 114. Similarly, the network environment 100 can include any number of the first service computing devices 101, the second service computing devices 102, the processing devices 120, the workstations 106, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first customer computing device 110, the second customer computing device 112, and the Nth customer computing device 114 may communicate with the first service computing device 101, which is a web server 101 over the communication network 118. For example, each of the multiple computing devices 110, 112, 114 may be operable to view, access, and interact with a website, such as a retailer's website, hosted by the web server 101. For example, a customer may operate one of the customer computing devices 110, 112, 114 to initiate a web browser that is directed to the website hosted by the web server 101. The customer may, via the web browser, search for items, view item advertisements for items displayed on the website, and click on item advertisements and/or items in the search result, for example. The website may capture these activities as user session data, and transmit the user session data to the second service computing device 102 over the communication network 118, the seek service from the second service computing device 102. That is, the second service computing device 102 may serve as a dependency system for the web server 101. There may be a circuit breaker between the web server 101 and the second service computing device 102, such that the web server 101 can only call the second service computing device 102 for service when the circuit breaker is at a closed state. When the circuit breaker is at an open state, the first service computing device 101 will either bypass the service provided by the second service computing device 102 or replace the service from the second service computing device 102 with a predetermined fallback service at another dependency device.

In some examples, the web server 101 transmits a recommendation request to the second service computing device 102, which serves as a recommendation engine in these examples. The recommendation request may be a search request sent together with a search query provided by the customer (e.g., via a search bar of the web browser, or via a conversational interface of chatbot), or a standalone recommendation request provided in response to the user's action on the website, e.g. interacting (e.g., engaging, clicking, or viewing) with one or more items, adding one or more items to cart, purchasing one or more items, opening or refreshing a homepage. When a circuit breaker between the web server 101 and the second service computing device 102 is closed, the second service computing device 102 may generate a list of recommended items, e.g. based on an anchor item or a search query indicated by the recommendation request. The web server 101 may then provide the list of recommended items to the customer on one or more web pages. When the circuit breaker between the web server 101 and the second service computing device 102 is open, the web server 101 could go with another search engine or recommendation engine, or just bypass this service and provide a response to the customer indicating a temporary down or suspension of the recommendation service.

In some examples, the web server 101 transmits an intent analysis request to the second service computing device 102, which serves as an artificial intelligence (AI) engine in these examples. The intent analysis request may be a request seeking an intent of a user related to an utterance or text input by the user. For example, the user may input "I want my order of potato chips changed from big packet to small packet and a refund of the price difference." When a circuit breaker between the web server 101 and the second service computing device 102 is closed, the second service computing device 102 may analyze the user's input using a pre-trained natural language processing model, to determine an intent of the user based on the user's input, and maybe based on the user's previous actions on the website as well. The web server 101 may then determine one or more requests based on the intent determined by the second service computing device 102, and provide corresponding services, which may include providing a natural language response generated by the second service computing device 102 to the user. When the circuit breaker between the web server 101 and the second service computing device 102 is open, the web server 101 could go with another AI engine, or just bypass this service and provide a response to the customer indicating a temporary down or suspension of the AI service.

The first service computing device 101 and/or the second service computing device 102 may be operable to communicate with the database 116 over the communication network 118. For example, the first service computing device 101 can store data to, and read data from, the database 116. The database 116 can be a remote storage device, such as a cloud-based server, a disk (e.g., a hard disk), a memory device on another application server, a networked computer, or any other suitable remote storage. Although shown remote to the first service computing device 101, in some examples, the database 116 can be a local storage device, such as a hard drive, a non-volatile memory, or a USB stick. In some examples, the first service computing device 101 may store purchase data, user session data, search data, etc. into the database 116. In some examples, the second service computing device 102 may retrieve the purchase data, user session data, search data, etc. from the database 116.

In some examples, the second service computing device 102 may execute one or more models (e.g., algorithms), such as a machine learning model, deep learning model, statistical model, etc., to provide the dependency service to the web server 101. In some examples, the second service computing device 102 generates training data for a plurality of models (e.g., machine learning models, deep learning models, statistical models, algorithms, etc.) based on e.g. holiday and event data, recall data, historical user session data, search data, purchase data, catalog data, and/or advertisement data for the users. The second service computing device 102 trains the models based on their corresponding training data, and stores the models in a database, such as in the database 116 (e.g., a cloud storage). The models, when executed by the second service computing device 102, allow the second service computing device 102 to determine item recommendations to be displayed to a customer, determine an intent of a user based on an utterance or text input, perform a ranking of items, determine a layout of a web page, etc. For example, the second service computing device 102 may obtain the models from the database 116. The second service computing device 102 may then receive, in real-time from the web server 101, a search request identifying a query and seeking N items to be displayed on a search result page of the website to a user. In response to receiving the search request, the second service computing device 102 may execute the models to determine recommended items to display to the user.

In some examples, the second service computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the second service computing device 102 may provide a corresponding service response to the first service computing device 101. That is, while the second service computing device 102 provides a dependency service to the first service computing device 101, this dependency service provided by the second service computing device 102 is in turn dependent on service(s) provided by the one or more processing devices 120.

Figure 2:
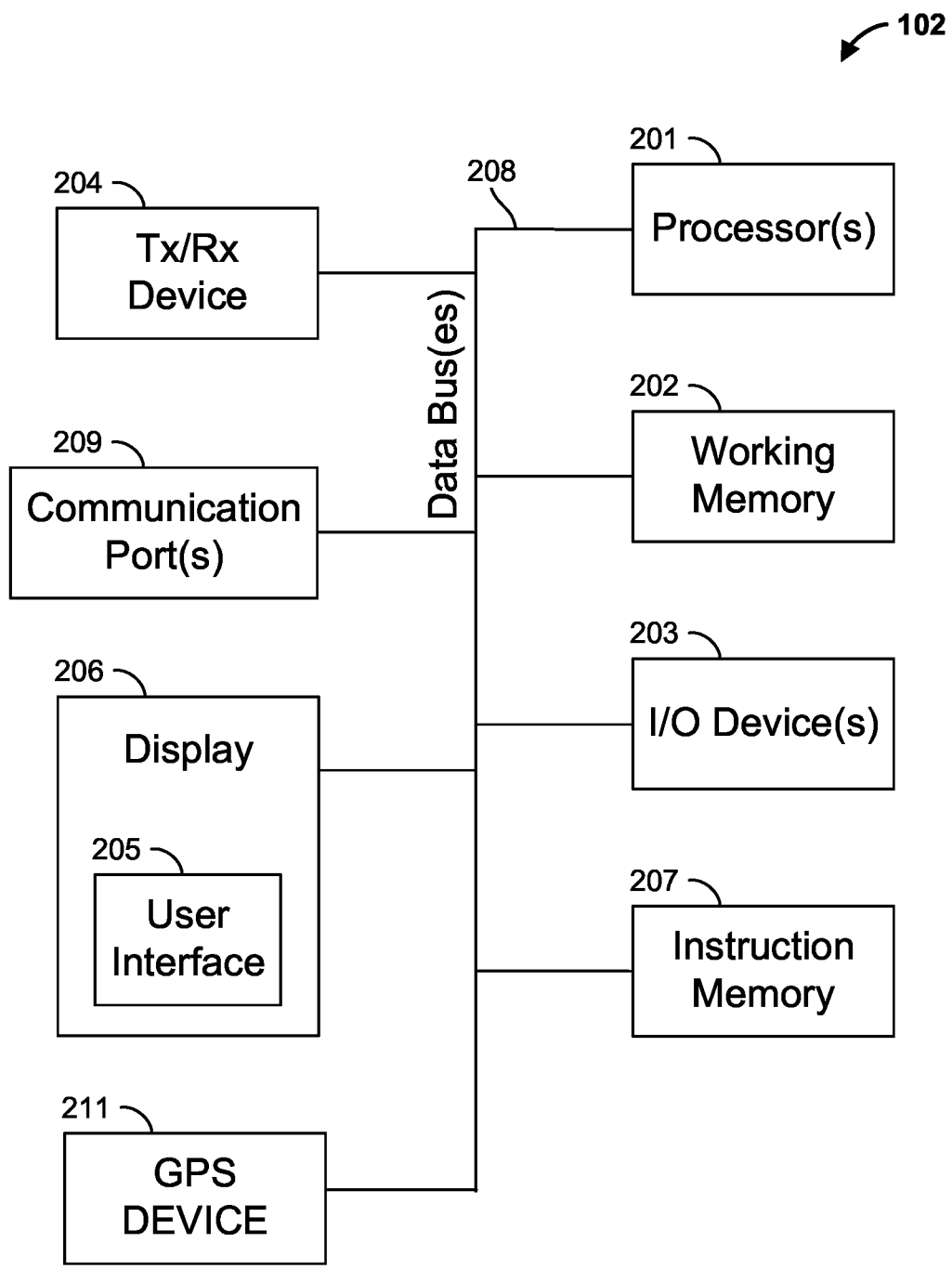
FIG. 2 is a block diagram of a service computing device, in accordance with some embodiments of the present teaching.

FIG. 2 illustrates a block diagram of a service computing device, e.g. the second service computing device 102 of FIG. 1, in accordance with some embodiments of the present teaching. In some embodiments, each of the first service computing device 101, the second service computing device 102, the workstation(s) 106, the multiple customer computing devices 110, 112, 114, and the one or more processing devices 120 in FIG. 1 may include the features shown in FIG. 2. Although FIG. 2 is described with respect to the second service computing device 102, it should be appreciated, however, that the elements described can be included, as applicable, in any of the first service computing device 101, the second service computing device 102, the workstation(s) 106, the multiple customer computing devices 110, 112, 114, and the one or more processing devices 120.

As shown in FIG. 2, the second service computing device 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the second service computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the second service computing device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the second service computing device 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the second service computing device 102 may determine a local geographical area (e.g., town, city, state, etc.) of its position. Based on the geographical area, the second service computing device 102 may determine relevant trend data (e.g., trend data identifying events in the geographical area).

Figure 3:
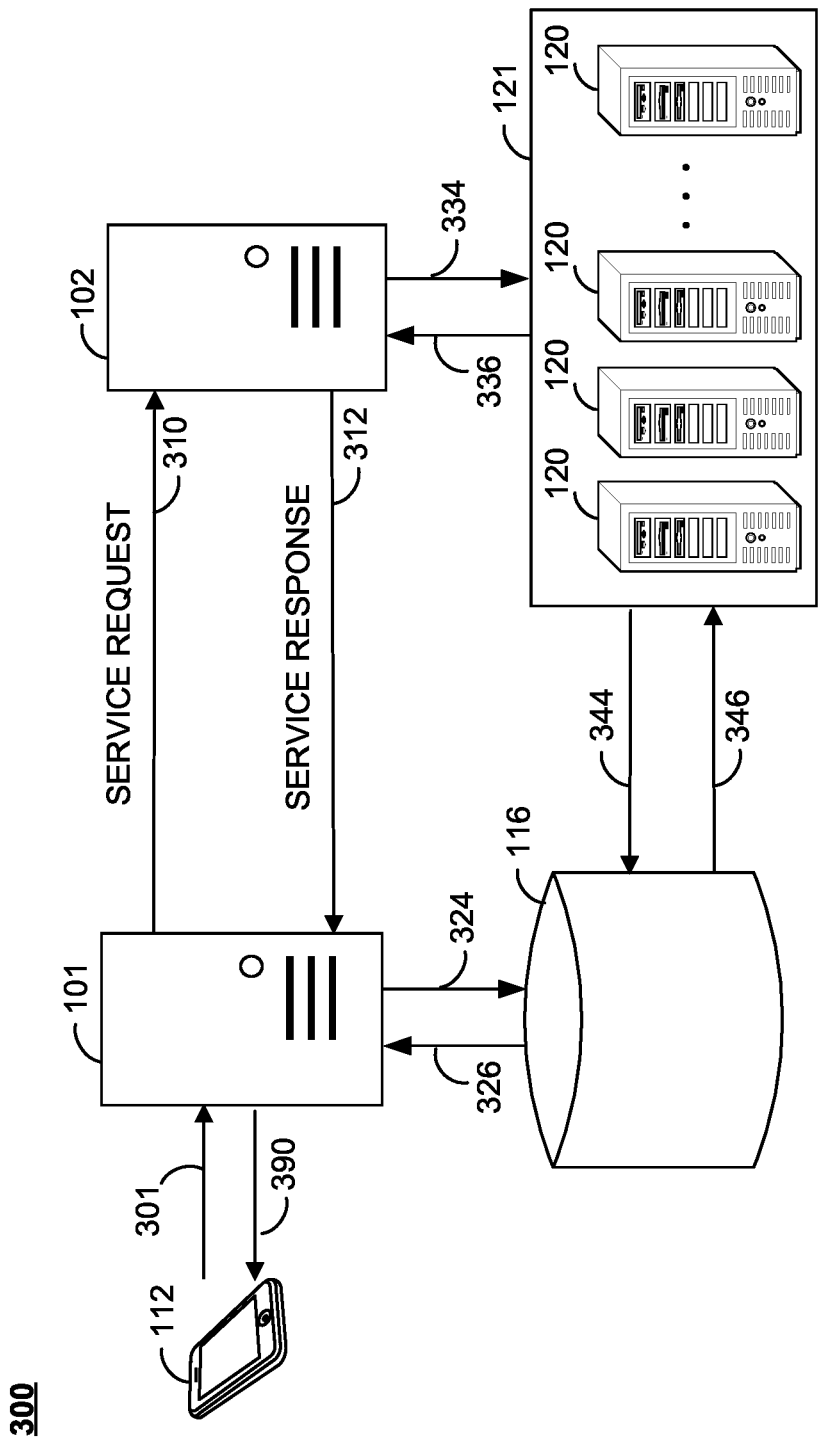
FIG. 3 illustrates an exemplary service mesh network, in accordance with some embodiments of the present teaching.

FIG. 3 illustrates an exemplary service mesh network 300, in accordance with some embodiments of the present teaching. As indicated in FIG. 3, the service mesh network 300 may include the customer computing device 112, the first service computing device 101, the second service computing device 102, the database 116, and the cloud-based engine 121 including one or more processing devices 120. In some embodiments, the first service computing device 101 may transmit a service request 310 to the second service computing device 102, after receiving a message 301 from the customer computing device 112. For example, the message 301 may be a query submitted by a user via the customer computing device 112 to a website hosted by a web server implemented as the first service computing device 101. The second service computing device 102 may be a search engine functioning as a dependency system for the first service computing device 101, to parse the query, analyze the query, determine search results matching the query, and provide a service response 312 to the first service computing device 101. In some embodiments, the second service computing device 102 may call computation services from the cloud-based engine 121 by a request 334, to determine the search results based on a response 336 from the cloud-based engine 121. That is, the cloud-based engine 121 may function as a dependency system for the second service computing device 102, e.g. to search the database 116 by a request 344 to obtain a response 346, and run some machine learning model based on the response 346 to determine some candidate items matching the query. In this case, the database 116 is a dependency system for the cloud-based engine 121. The database 116 may also be a dependency system for the first service computing device 101, to provide data 326 to the first service computing device 101 upon receiving a request 324. In some examples, the database 116 may also be a dependency system for the second service computing device 102, and/or a dependent system for another database. For example, the database 116 may store and provide to the first service computing device 101, the second service computing device 102 or the cloud-based engine 121 based on read/write operations: user session data, item engagement data, submitted query data, user transaction data, search data, catalog data, and/or machine learning model data.

In the example shown in FIG. 3, the first service computing device 101 is dependent on the second service computing device 102 for service execution; and the second service computing device 102 is in turn dependent on the cloud-based engine 121 for service execution. Between the first service computing device 101 and the second service computing device 102, the first service computing device 101 is a dependent or upstream system, while the second service computing device 102 is a dependency or downstream system. Between the second service computing device 102 and the cloud-based engine 121, the second service computing device 102 is a dependent or upstream system, while the cloud-based engine 121 is a dependency or downstream system. In one example, a service at a downstream dependency system may fail, due to e.g. a jammed database used by the service, a bug in the code for the service, a network outage, a denial of service, or any other issue causing the downstream service to fail to deliver what the upstream service is expecting according to a predetermined contract or protocol. Then, if the upstream or dependent service keeps calling the downstream dependency service, the downstream dependency service may keep getting overwhelmed and not be able to fulfill any task. In addition, while the upstream or dependent service keeps waiting for the response from the downstream, the upstream or dependent service itself may get bogged down as more requests are received for the upstream or dependent service. A circuit breaker between the upstream or dependent service and the downstream dependency service can help preventing the above mentioned issues.

Figure 4A:
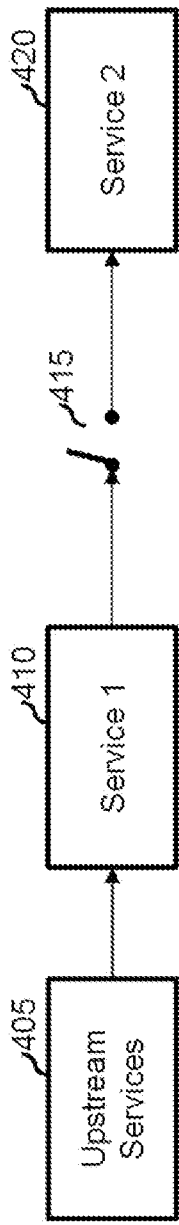
FIGS. 4A-4C illustrate different states of a circuit breaker connected between two services, in accordance with some embodiments of the present teaching.
Figure 4B:
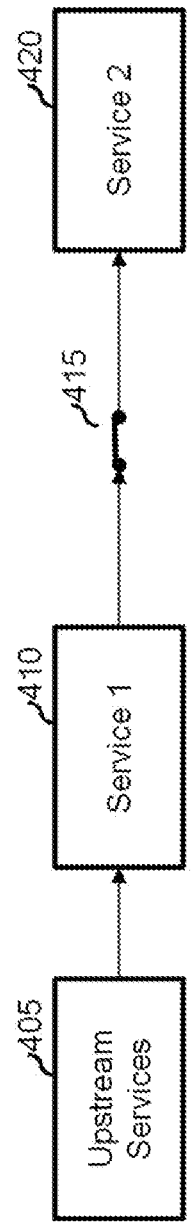
Figure 4C:
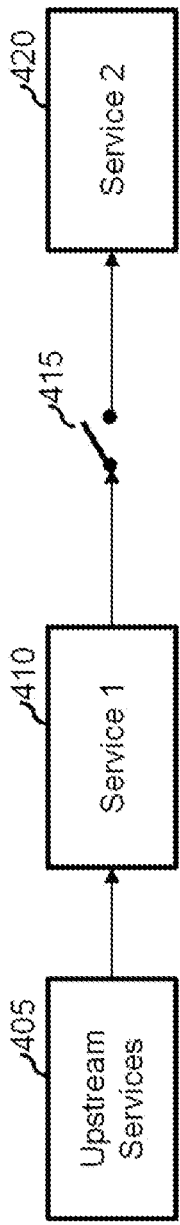

FIGS. 4A-4C illustrate different states of a circuit breaker connected between two services or two devices, components or systems, in accordance with some embodiments of the present teaching. As shown in FIG. 4A, a circuit breaker 415 is deployed between a service 1 410 (which is a dependent service) and a service 2 420 (which is a dependency service). In some examples, the service 1 410 may be any service calling a downstream service for execution. For example, the service 1 410 may be a service provided by the first service computing device 101, the second service computing device 102 or the cloud-based engine 121. In some examples, the service 2 420 may be any service being called by an upstream service for execution. For example, the service 2 420 may be a service provided by the second service computing device 102, the cloud-based engine 121 or the database 116. Accordingly, the circuit breaker 415 may be one of circuit breakers deployed between the first service computing device 101 and the second service computing device 102, between the second service computing device 102 and the cloud-based engine 121, between the cloud-based engine 121 and the database 116, and/or between the first service computing device 101 and the database 116.

In the example shown in FIG. 4A, the circuit breaker 415 is at an open state, which means the circuit breaker 415 is fully open and no call from the service 1 410 can go to the service 2 420. This may happen when the service 2 420 fails to deliver what was expected by the service 1 410, for more often than a predetermined threshold, e.g. when the service 2 420 has a failure rate higher than a failure threshold. While the service 1 410 itself may be called by upstream services 405, the circuit breaker 415 is configured to open and trip the calling to the service 2 420 for a time period, to avoid overwhelming the service 2 420. In this case, the service 1 410 may seek a replacement, e.g. a predetermined fallback service, for the service 2 420. While this may generate a degraded version of a desired service 1 410, it is much better than waiting for the failed service 2 420 without any delivery of the desired service 1 410.

In the example shown in FIG. 4B, the circuit breaker 415 is at a closed state, which means the circuit breaker 415 is fully closed and every call from the service 1 410 can go to the service 2 420. This may happen when the service 2 420 does not fail or its failure rate is lower than a failure threshold. While the service 1 410 itself may be called by upstream services 405, the circuit breaker 415 is configured to be closed to keep all calls to the service 2 420 going through smoothly and timely to avoid overwhelming the service 1 410.

In the example shown in FIG. 4C, the circuit breaker 415 is at a half open state, which means the circuit breaker 415 is not fully open and only a limited number of probe calls from the service 1 410 can go to the service 2 420. This may happen after the circuit breaker 415 is at the open state for a predetermine time period. The purpose of the probe calls is to check whether the service 2 420 can provide correct and expected responses, e.g. by checking whether the probe calls to service 2 420 have a failure rate lower than a failure threshold. If so, the circuit breaker 415 can be switched to the closed state. Otherwise, the circuit breaker 415 may go back to the open state. While the circuit breaker 415 is at the half open state, the service 1 410 may seek a replacement, e.g. a predetermined fallback service, for the service 2 420, or use the service 2 420 if an expected response is received based on a probe call to the service 2 420.

Figure 5:
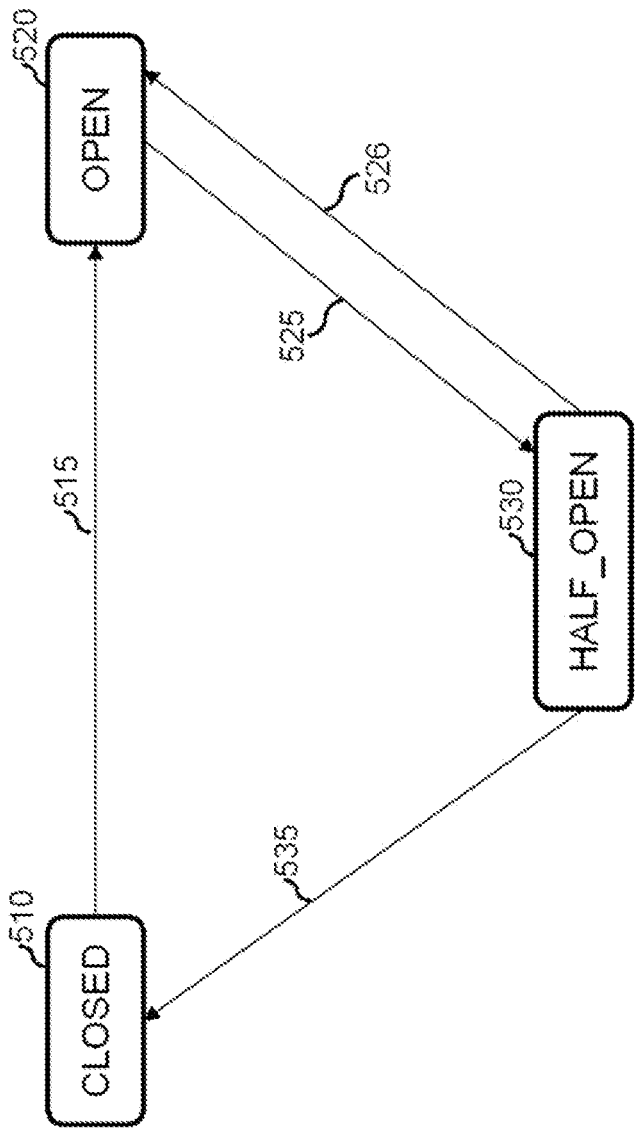
FIG. 5 illustrates exemplary state transitions of a circuit breaker, in accordance with some embodiments of the present teaching.

In some embodiments, the circuit breaker 415 may switch or transition from one state to another based on one or more conditions. FIG. 5 illustrates exemplary state transitions of a circuit breaker, e.g. the circuit breaker 415 in FIG. 4, in accordance with some embodiments of the present teaching. As shown in FIG. 5, a circuit breaker may transition between a closed state 510, an open state 520, and a half open state 530.

In some embodiments, during a normal operation, the circuit breaker is in the closed state 510. When a condition 515 is met, e.g. when a failure rate of calling a downstream or dependency service is above certain failure threshold, the circuit breaker transitions to the open state 520, such that calls to the dependency service are no longer made and a fallback service is triggered to replace the dependency service.

In some embodiments, the circuit breaker may transition to the half open state 530 once a condition 525 is met. For example, the circuit breaker may stay in the open state 520 for a pre-configured time period, after which the circuit breaker automatically transitions to the half open state 530. The circuit breaker can transition back to the open state 520 from the half open state 530 if a condition 526 is met; and can transition back to the closed state 510 from the half open state 530 if a condition 535 is met. For example, while the circuit breaker is in the half open state 530, a few probing calls may be made by the upstream or dependent service to check the status of the dependency service. On one hand, if the probing calls succeed, e.g. when a failure rate of the probing calls is above a failure threshold, the circuit breaker can transition back to the open state 520, which means the downstream service still has issues. On the other hand, when the failure rate of the probing calls is below the failure threshold, the circuit breaker can transition back to the closed state 510, which means the downstream service is back on and ready to take calls from the upstream service. A probing call or probe call may be the same as a normal call, except in a much lower volume than normal calls.

In some embodiments, each of the failure thresholds in the conditions 515, 526, 535 can be adaptively computed. In some embodiments, the failure thresholds in the conditions 515, 526, 535 may be equal to each other. In some embodiments, a failure threshold for a circuit breaker can be computed based on its correlation to an integration reliability. A reliability of a software or service system may be a function of failures during a specified measurement period. Less failures mean higher reliability to perform intended activity of the system. Since circuit breakers are meant to be used to protect the dependent system from catastrophic failures in the dependency system, circuit breakers can also have a close relation to system failures. Based on this relation between reliability and circuit breaker thresholds, the present teaching establishes a mathematical formula making reliability a dependent variable of the circuit breaker threshold.

In some embodiments, a formula can be derived to determine the circuit breaker failure thresholds and its implementation in form of a library may be used in every component that relies on a circuit breaker. In some embodiments, the reliability can be expressed as a probability which is complement of probability of failures. While many models can be used for reliability, an exponential distribution function is chosen to model the reliability primarily for the following reasons. First, an exponential distribution is a good model to represent a time when the next failure event would occur, and may be used to model a variety of use cases related to success, failure, or arrival events. Failures in an interaction of two services (e.g. dependent and dependency services connected with a circuit breaker) are generally independent of each other and are well represented on a time graph using this exponential function of the decay parameter (e.g. hazard rate for failures). Second, since the dependent system only cares about dependency system's failures which would impact the dependent system's operations and QoS, the exponential model suits well as it is based on failure/hazard rate, time, and number of calls made by the dependent system. Further, an exponential distribution here can help with its memory less property. If a component has had a certain reliability in the last T units of time, then the reliability of this component for next t units of time would be the same as if the interaction was starting at time 0. This can be expressed as:

$$Rc(X > T + t | X > T|) = Rc(X > t), \quad (1)$$

where Rc represents an interaction reliability probability. This states that the interaction reliability for future t time units will be the same as an interaction reliability of previous T time units+t time units, if it has already lasted T time units. Here T is the past reliability measurement time period and t is the future reliability prediction period which may be used as a failure measurement window for a circuit breaker.

In some embodiments, an exponential distribution is given by the following formula:

$$Rc = e^{-\lambda \times t} \quad (2)$$

where $\lambda$ represents the hazard rate (or failure rate) and t represents a time window for circuit breaker failure evaluation. The hazard rate $\lambda$ is the number of failures that happen in a specified period of time and may be computed based on:

$$\lambda = \frac{\text{Number of Failures}}{N * T} \quad (3)$$

where N represents the number of calls made per unit time, T represents a reliability measurement period.

If X is the circuit breaker failure threshold to be determined, the above equation can be rewritten as $$Rc = e^{-\frac{X*t}{N*T}} \quad (4)$$

If the reliability was Rc for T time units (e.g. T=1 min), a circuit breaker may be configured with a maximum failure threshold X that the interaction can tolerate to retain the reliability score at Rc for the next t units of time (e.g. 10 seconds). Based on the above equations, X can be given as:

$$X = -\frac{(N*T) * \log_e(R_c)}{t} \quad (5)$$

where X gives an upper bound on tolerable failures for time window t. As long as failures remain under X, the reliability of the interaction remains above or equal to Rc.

In some embodiments, certain limits can be put on the value of X. For example, as failures approach 0, reliability approaches 1. Hence, $$\lim_{X \to 0} e^{-\frac{X*t}{N*T}} = 1 \quad (6)$$

On the other extreme, X cannot exceed total calls made in a prediction measurement window. Hence as X tends to get closer to N*t, reliability will tend to:

$$\lim_{X \to N*t} e^{-\frac{X*t}{N*T}} = e^{-\frac{t^2}{T}} \quad (7)$$

Figure 6:
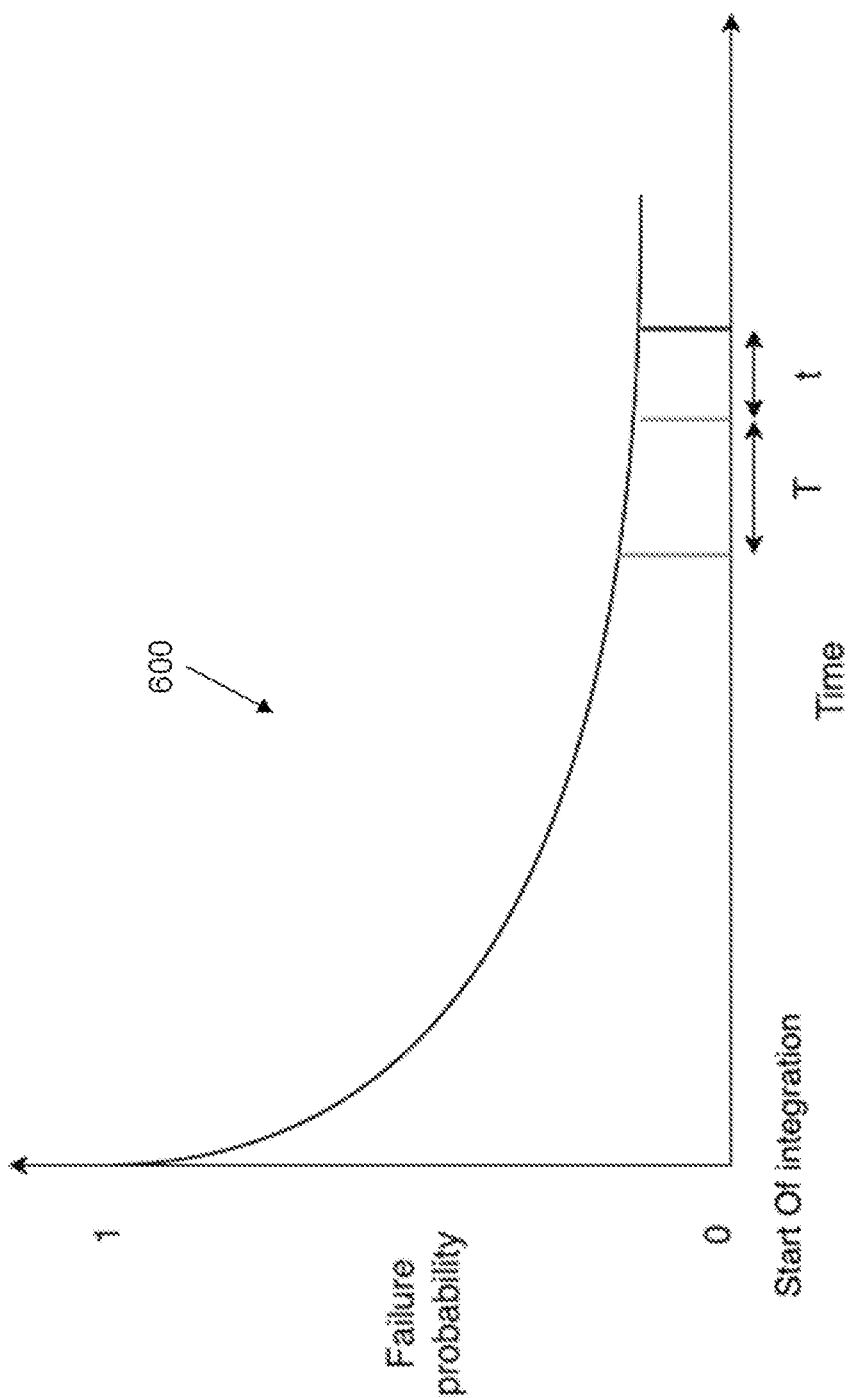
FIG. 6 illustrates an exemplary exponential distribution for failure probability, in accordance with some embodiments of the present teaching.

FIG. 6 illustrates an exemplary exponential distribution 600 for failure probability, in accordance with some embodiments of the present teaching. The exponential distribution 600 in FIG. 6 represents an exponential degradation of failures with time. In some embodiments, time is calculated from the start of integration or from any other convenient point (e.g. last deployment of either of the dependent and dependency systems). As the integration stabilizes, the failure probability goes down, thereby increasing reliability. FIG. 6 shows a reliability measurement time window T for which the average reliability is measured, and the hazard rate is calculated. Then the prediction time t (which is the size of the circuit breaker sliding window) is used to determine the failure threshold at the calculated reliability or a desired reliability, which may be larger than or equal to actual reliability.

Figure 7:
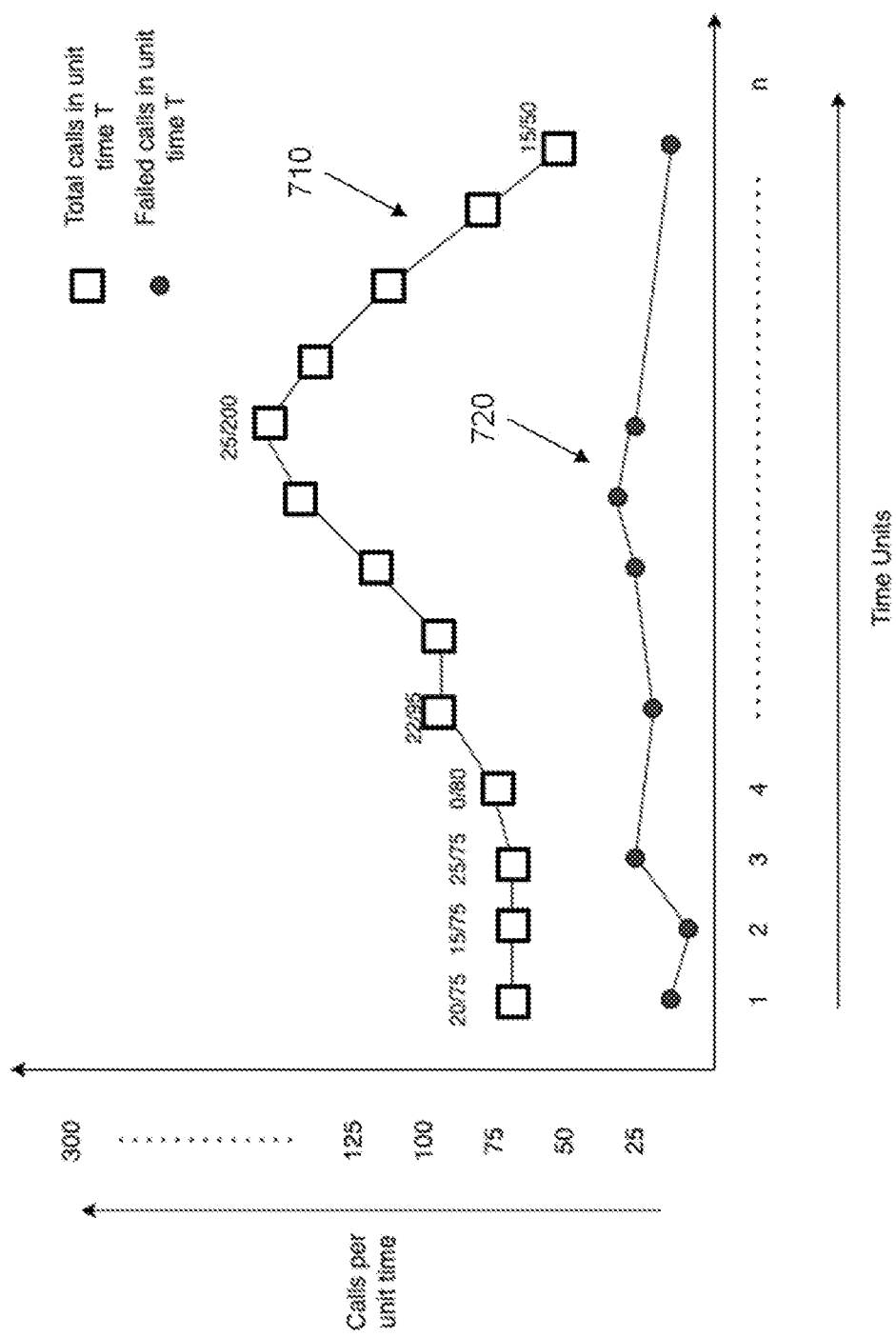
FIG. 7 illustrates an exemplary measurement of failure rate, in accordance with some embodiments of the present teaching.

This above disclosed methodology to compute failure threshold based on reliability can be used on various component interactions. FIG. 7 illustrates an exemplary measurement of failure rate (or say hazard rate) and reliability, in accordance with some embodiments of the present teaching. As shown in FIG. 7, a disclosed system can count a total number of calls 710 in unit time T, and measure the number of failed calls 720 in unit time T, for each unit time T of n time units. Based on the total number of calls 710 and the number of failed calls 720 in each unit time T, the system can compute a time series of failure rates, and compute a total failure rate for the n time windows or time units based on a 99th percentile of the time series of failure rates. Then, the system can compute the integration reliability over that time period (comprising the n time units) as a complement of the 99th percentile:

$$R_c = 1 - P_{99}\left(\frac{20}{75}, \frac{15}{75}, \frac{25}{75}, \frac{0}{80}, \frac{22}{95}, \cdots \frac{25}{200}, \frac{15}{50}\right) \qquad (8)$$

This measured reliability $R_c$ can be used to compute the value of X for the circuit breaker failure threshold, e.g. based on Equation (5).

A circuit breaker can be configured based on either a time based sliding window or a count based sliding window. In some embodiments, a circuit breaker is configured based on a time based sliding window for high throughput scenarios, e.g. when the throughput is significant with a measured transactions per second (TPS) higher than 100 TPS, 520 TPS, or 5000 TPS.

In some embodiments, a circuit breaker is configured using a count based sliding window for scenarios where calls made to dependency are very sporadic or have extremely low volume. In these scenarios, the period of measurement and prediction may be extended such that they cancel each other. As such, Equation (5) can be reduced to:

$$X = -N * \log_e(R_c) \qquad (9)$$

where N is the total number of calls made for a period encompassing all traffic variations in the low or sporadic call integration.

In some embodiments, for a new integration without any past data, the system can use concept of subjective probability to define a desired reliability $R_c$. For example, in the microservices context of subjective probability, the reliability score can be determined based on the tiering of the interaction between dependent and dependency services. For example, a subjective reliability of 0.99 is defined for Tier T0; a subjective reliability of 0.95 is defined for Tier T1; and a subjective reliability of 0.85 is defined for Tier T2. Then, as more data becomes available during the course of usage, the reliability number can be adjusted and appropriate strategy may be chosen, e.g. according to a circuit breaker configuration library.

Figure 8:
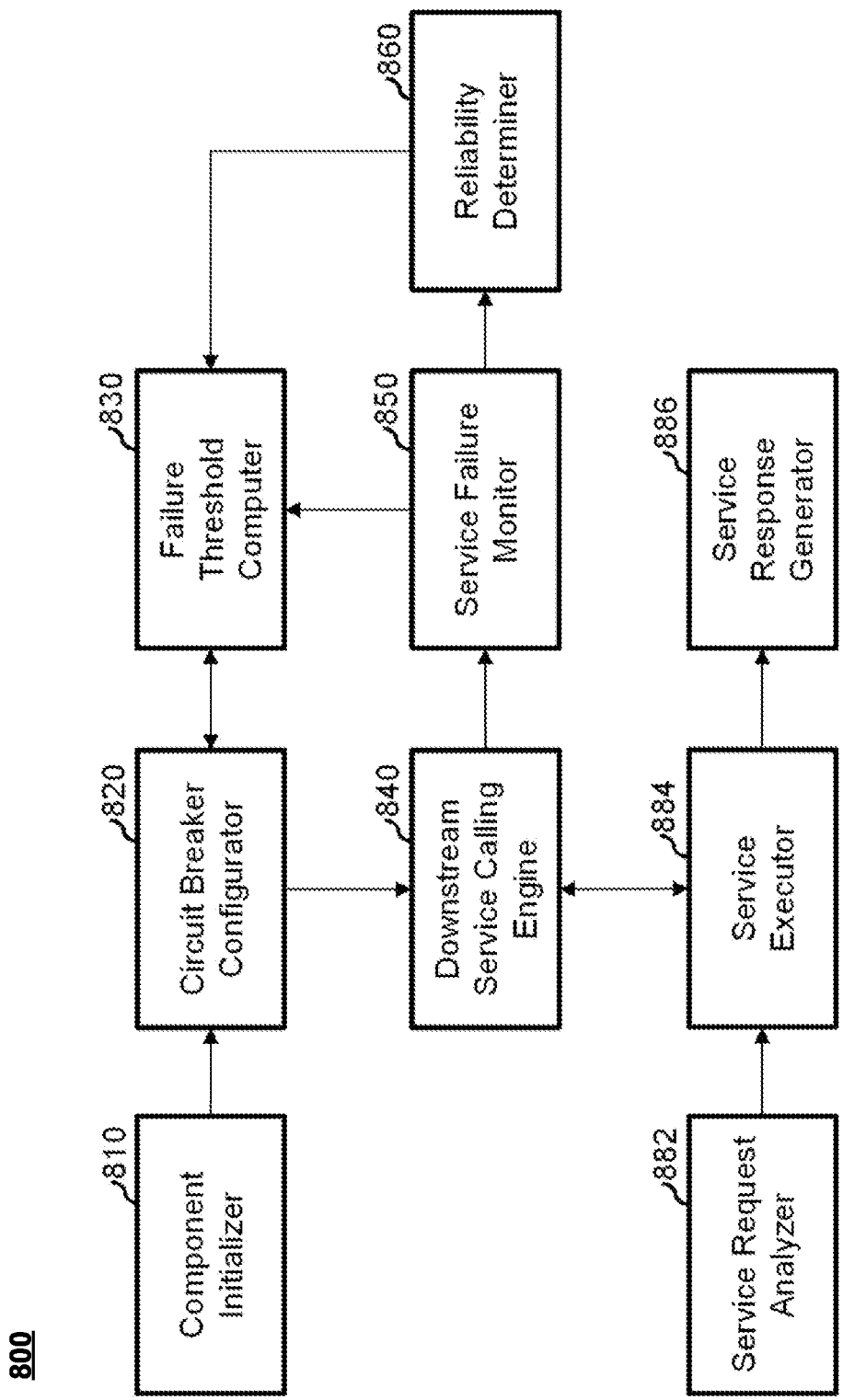
FIG. 8 shows an exemplary block diagram illustrating a more detailed view of a service computing device deployed in a network, in accordance with some embodiments of the present teaching.

FIG. 8 shows an exemplary block diagram illustrating a more detailed view of a service computing device 800 deployed in a network, in accordance with some embodiments of the present teaching. In some embodiments, the service computing device 800 may be any dependent system that calls another service at a dependency system for execution of the service at the service computing device 800. For example, the service computing device 800 may be any one of the first service computing device 101, the second service computing device 102, or the cloud-based engine 121 in FIG. 1 and FIG. 3. As shown in FIG. 8, the service computing device 800 includes a component initializer 810, a circuit breaker configurator 820, a failure threshold computer 830, a downstream service calling engine 840, a service failure monitor 850, a reliability determiner 860, a service request analyzer 882, a service executor 884, and a service response generator 886. In some examples, one or more of the component initializer 810, the circuit breaker configurator 820, the failure threshold computer 830, the downstream service calling engine 840, the service failure monitor 850, the reliability determiner 860, the service request analyzer 882, the service executor 884, and the service response generator 886 are implemented in hardware. In some examples, one or more of the component initializer 810, the circuit breaker configurator 820, the failure threshold computer 830, the downstream service calling engine 840, the service failure monitor 850, the reliability determiner 860, the service request analyzer 882, the service executor 884, and the service response generator 886 are implemented as an executable program maintained in a tangible, non-transitory memory, such as instruction memory 207 of FIG. 2, which may be executed by one or processors, such as the processor 201 of FIG. 2.

For example, the component initializer 810 may initialize components in the service computing device 800 when the service computing device 800 is turned on or back on from sleep. Upon the initialization, the circuit breaker configurator 820 may configure a circuit breaker between the service computing device 800 and a downstream computing device. In some embodiments, the service computing device 800 and the downstream computing device are deployed in a network on a cloud environment. In some embodiments, a first service executed at the service computing device 800 is dependent on a second service executed at the downstream computing device, via the circuit breaker. In some embodiments, the first service and the second service are deployed into a service mesh on a cloud environment.

In some embodiments, the circuit breaker configurator 820 may call the failure threshold computer 830 to configure an adaptive threshold for the circuit breaker. The failure threshold computer 830 can compute the adaptive threshold for the circuit breaker regarding a first time period based at least partially on an integration reliability of interaction between the first service and the second service executed during a past time period. The integration reliability may be measured or determined by the reliability determiner 860.

In some embodiments, the service request analyzer 882 may be configured to obtain a request for the first service within the first time period, e.g. from an upstream service of the service computing device 800 or from a device of a user or customer. The service executor 884 may execute the first service based on the request, such that the service response generator 886 can generate a service response based on the execution. During the execution of the first service, the service executor 884 may use the downstream service calling engine 840 to call the second service at the downstream computing device through the circuit breaker. The downstream service calling engine 840 may call the downstream computing device based on a request from the service executor 884, and based on configurations of the circuit breaker from the circuit breaker configurator 820, where the configurations include the adaptive threshold. In some embodiments, the adaptive threshold for the circuit breaker is computed or updated by the failure threshold computer 830 periodically, e.g. every month, every week, every day, or every hour. In some embodiments, the adaptive threshold for the circuit breaker is computed or updated by the failure threshold computer 830 upon a holiday season, an event or a request.

In some embodiments, the circuit breaker trips to stop the calling of the second service when a failure rate of interaction between the first service and the second service in the first time period exceeds the adaptive threshold. In some embodiments, the circuit breaker can switch from a closed state to an open state when the failure rate exceeds a first adaptive threshold; switch from the open state to a half open state automatically after a predetermined time period; switch from the half open state to the open state when the failure rate exceeds a second adaptive threshold; and switch from the half open state to the closed state when the failure rate is below or equal to the second adaptive threshold. The circuit breaker in the closed state may connect the first service with the second service by passing all calls from the first service to the second service. The circuit breaker in the open state may disconnect the first service with the second service by passing no call from the first service to the second service. The circuit breaker in the half open state may connect the first service with the second service by passing only probe calls from the first service to the second service. In some embodiments, the first adaptive threshold and the second adaptive threshold are both equal to the adaptive threshold that is determined based on the integration reliability by the failure threshold computer 830.

While the downstream service calling engine 840 calls the second service at the downstream computing device through the circuit breaker, the service failure monitor 850 can monitor various parameters related to service failures of the calls by the downstream service calling engine 840. For example, the service failure monitor 850 can measure or compute the failure rate based on a failure percentage of calls made per unit time. The service failure monitor 850 may provide these monitored parameters to the reliability determiner 860 for computing a reliability, and to the failure threshold computer 830 for computing the adaptive failure threshold. In some embodiments, the reliability determiner 860 may measure or determine the integration reliability based on a complement of a probability of failures of interaction between the first service and the second service during the past time period, where the probability of failures is assumed to follow an exponential distribution of time.

In some embodiments, the failure threshold computer 830 can adaptively determine the computing the adaptive threshold based on at least one of the following factors related to the first service and the second service: business criticality, system availability metric, traffic patterns, or categories of the first service and the second service. In some embodiments, the failure threshold computer 830 can compute the adaptive threshold based on a predetermined function of: a length of the past time period, a length of the first time period, a total number of calls made per unit time during the past time period, and the integration reliability. In some examples, when a calling frequency from the first service to the second service is higher than a first threshold, the adaptive threshold is computed based on a predetermined function of: a length of the past time period, a length of the first time period, a total number of calls made per unit time during the past time period, and the integration reliability. In some examples, when a calling frequency from the first service to the second service is lower than a second threshold, the adaptive threshold is computed based on a predetermined function of: a total number of calls made per unit time during the past time period, and the integration reliability, where the past time period encompasses all traffic variations of callings from the first service to the second service.

Figure 9:
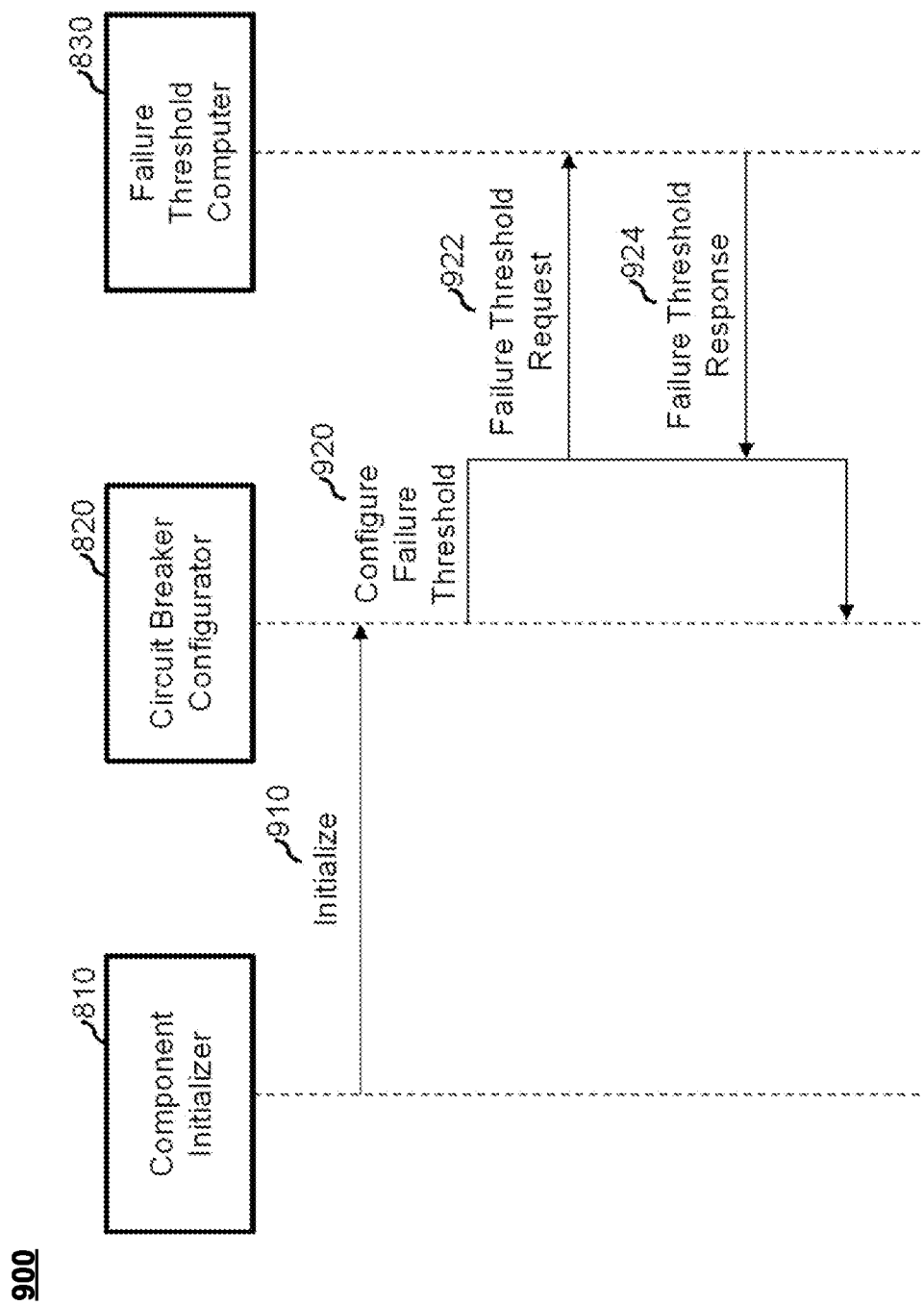
FIG. 9 illustrates an exemplary process for configuring a failure threshold for a circuit breaker, in accordance with some embodiments of the present teaching.

FIG. 9 illustrates an exemplary process 900 for configuring a failure threshold for a circuit breaker, in accordance with some embodiments of the present teaching. In some embodiments, the above derived equations may be integrated into a small library which may be used by any component to determine the failure thresholds. In the example shown in FIG. 9, after the component initializer 810 sends an initialization signal 910 to the circuit breaker configurator 820 during an initialization phase, the circuit breaker configurator 820 may configure a circuit breaker based on a circuit breaker provider library. This includes configuring a failure threshold 920 for the circuit breaker, e.g. by sending a failure threshold request 922 to the failure threshold computer 830 and receiving a corresponding failure threshold response 924 from the failure threshold computer 830. The failure threshold computer 830 in this example may compute the failure threshold based on a failure threshold library, who can help obtaining values used to compute the failure threshold, including e.g. the values for desired reliability, number of calls, reliability measurement period, etc.

Figure 10:
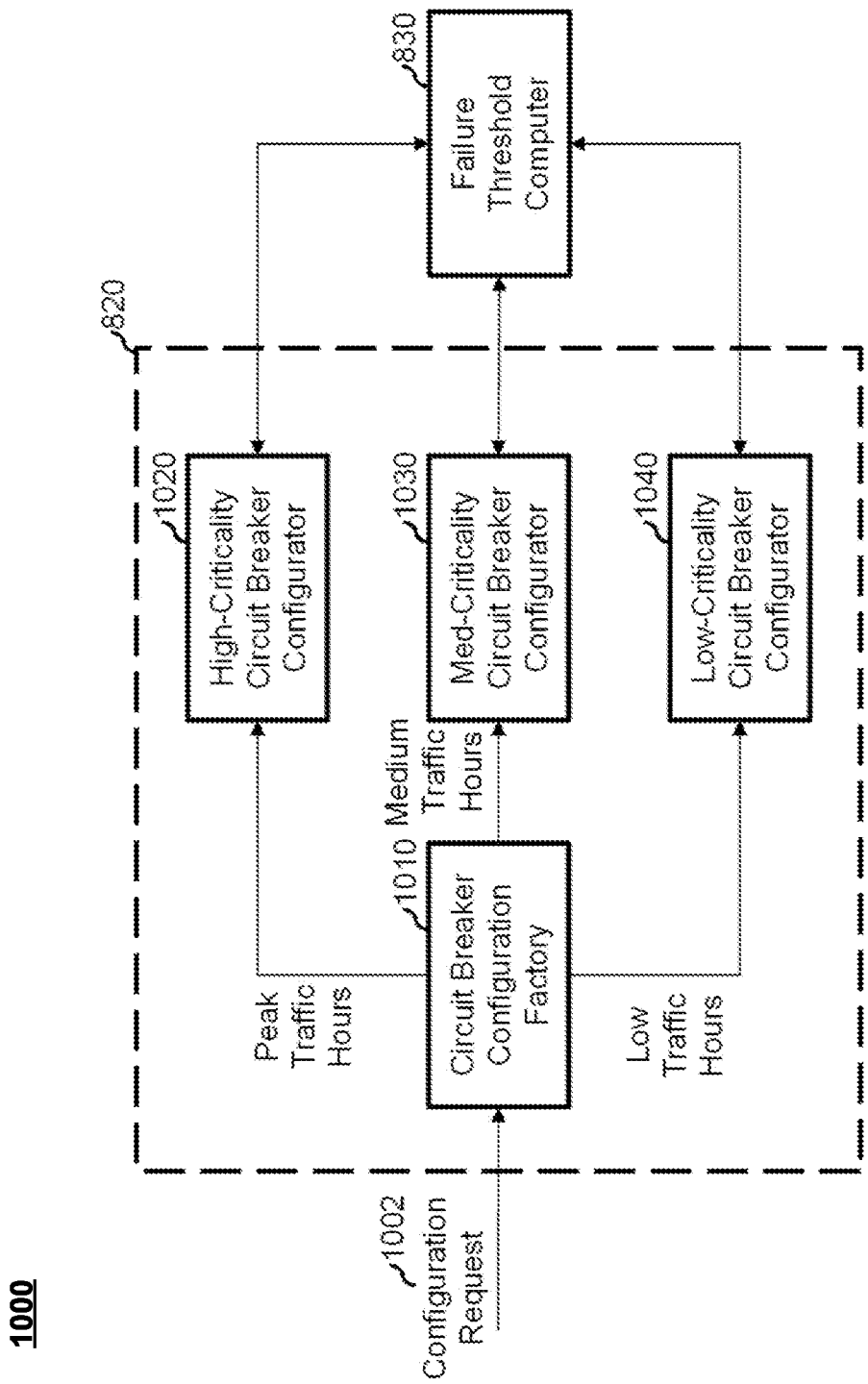
FIG. 10 shows an exemplary block diagram illustrating a more detailed view of a circuit breaker configurator, in accordance with some embodiments of the present teaching.

In some embodiments, while failure thresholds on the circuit breaker can be determined based on a function of reliability and number of calls made, different configurations can be applied based on changing traffic patterns throughout the day as well as potentially changing reliability numbers. FIG. 10 shows an exemplary block diagram illustrating a more detailed view of a circuit breaker configurator, e.g. the circuit breaker configurator 820 in FIG. 8, in accordance with some embodiments of the present teaching. In the example shown in FIG. 10, the circuit breaker configurator 820 includes a circuit breaker configuration factory module 1010, a high-criticality circuit breaker configurator 1020, a med-criticality circuit breaker configurator 1030, and a low-criticality circuit breaker configurator 1040. The circuit breaker configuration factory module 1010 may receive a configuration request 1002 for configuring a circuit breaker. In some embodiments, the configuration request 1002 may be generated by the component initializer 810 upon initialization, upon an event, or periodically.

In some embodiments, an interaction between two components or services can have higher business criticality during a certain time interval of the day (which means lower tolerance for failures) but have reduced criticality (which means higher tolerance for failures) during other times of the day. Accordingly, the circuit breaker configurator 820 and the failure threshold computer 830 in FIG. 10 can have a different calculation for the failure threshold adaptively based on time, such that the circuit breaker can switch between different configurations. In some examples, during a peak order download process for a market, a major order dump is sent to make multiple downstream system calls. During this kind of peak traffic hours, the reliability is desired to be in the region of 0.99. But after the major order download, the traffic reduces and the failure tolerance can also be a little higher as the critical business flow has been completed. As such, the reliability can drop to 0.95 or even lower. During store off hours, e.g. when traffic trickles to single digit calls, an even lower value of reliability can be used to avoid spurious circuit opens which would set off false alarms. That is, N may be different in Equations (5) and (9) throughout the day depending on traffic pattern. In addition, a granularity of T and t may change in Equation (5) throughout the day depending on traffic pattern. For example, during peak hours, the system might make decisions sooner and more frequently; during off peak hours, the system might tolerate a little more number of failures because there is more time to recover from failures. While different services may have different traffics, a same service may also have different traffics throughout the day.

As shown in FIG. 10, the circuit breaker configurator 820 may configure the circuit breaker based on these three varieties of load patterns. During peak traffic hours, the circuit breaker configuration factory module 1010 may forward the configuration request 1002 to the high-criticality circuit breaker configurator 1020 to configure the circuit breaker with a high desired reliability with a low failure threshold computed by the failure threshold computer 830. During medium traffic hours, the circuit breaker configuration factory module 1010 may forward the configuration request 1002 to the med-criticality circuit breaker configurator 1030 to configure the circuit breaker with a medium desired reliability with a medium failure threshold computed by the failure threshold computer 830. During low or no traffic hours, the circuit breaker configuration factory module 1010 may forward the configuration request 1002 to the low-criticality circuit breaker configurator 1040 to configure the circuit breaker with a low desired reliability with a high failure threshold computed by the failure threshold computer 830. Various other patterns may be used to switch between different threshold configurations based on importance of business, criticality of service, predicted number of calls, how much time desired for recovery, how much time between failures, etc. according to various embodiments.

Figure 11:
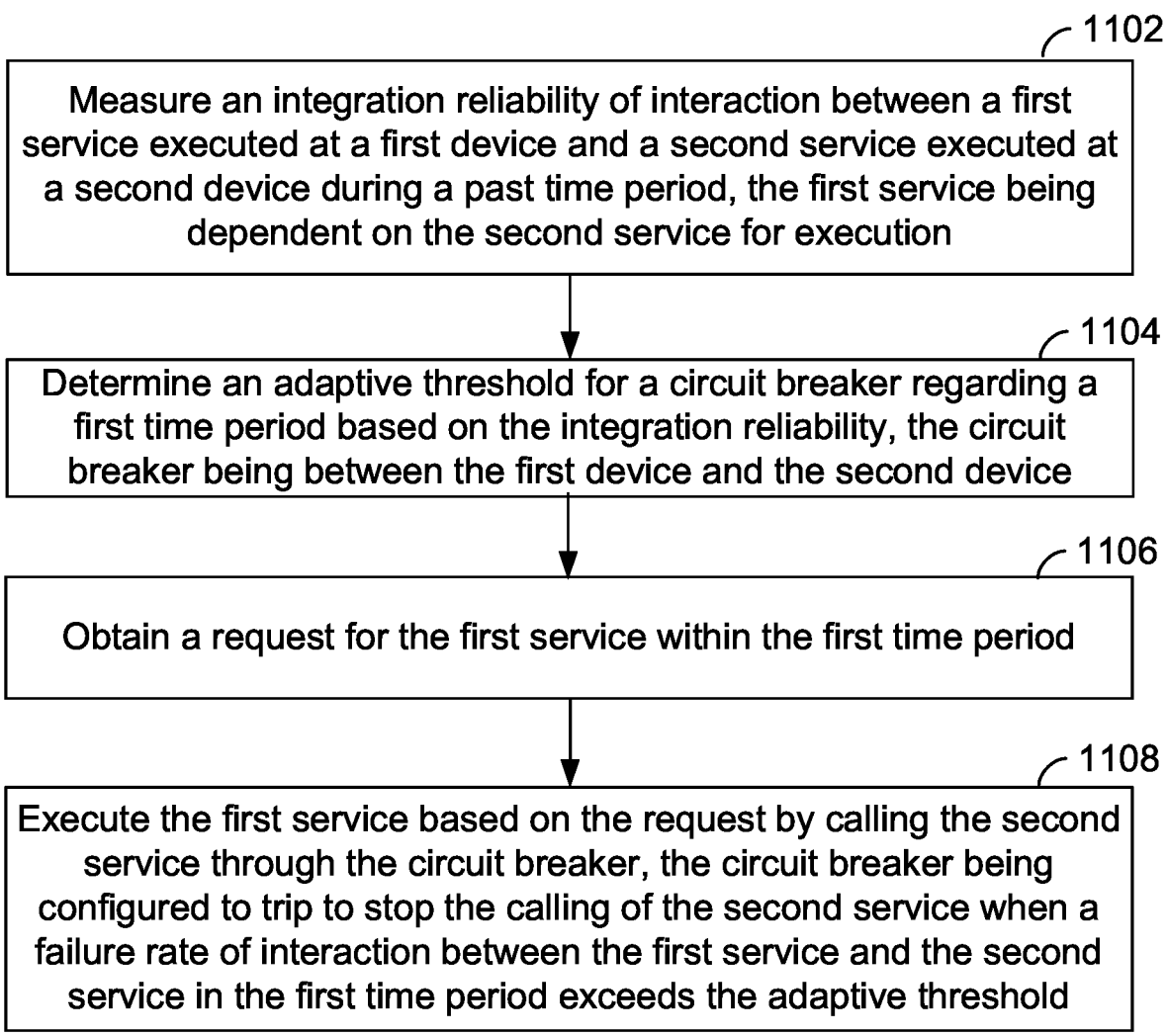
FIG. 11 is a flowchart illustrating an exemplary method for adaptively manage services using a circuit breaker, in accordance with some embodiments of the present teaching.

FIG. 11 is a flowchart illustrating an exemplary method 1100 for adaptively manage services using a circuit breaker, in accordance with some embodiments of the present teaching. In some embodiments, the method 1100 can be carried out by one or more computing devices, such as the first service computing device 101 and/or the second service computing device 102 of FIG. 1. Beginning at operation 1102, an integration reliability is measured for interaction between a first service executed at a first device and a second service executed at a second device during a past time period. The first service is dependent on the second service for execution. At operation 1104, an adaptive threshold is determined for a circuit breaker regarding a first time period based on the integration reliability. The circuit breaker is deployed between the first device and the second device, e.g. to control a call from the first device to the second device. At operation 1106, a request is obtained for the first service within the first time period. At operation 1108, the first service is executed based on the request by calling the second service through the circuit breaker. The circuit breaker may be configured to trip to stop the calling of the second service when a failure rate of interaction between the first service and the second service in the first time period exceeds the adaptive threshold.

While resiliency settings need to be associated with pre-defined system or business metrics to have a correlation with measurable metrics, the above described methodology for circuit breaker configuration can be used for all use cases with various traffic patterns and measured or desired reliability scores.

In a first exemplary use case, an enrichment manager calls a substitution service for every order to get substitutions for all the line items in it. The system can take the past 24 hours data broken up at minute level to determine the number of occurrences of failures due to calls to the substitution service, with measurement granularity window T=1 min. In some embodiments, the total minute windows under observation is equal to 24*60=1440; the circuit breaker between the enrichment manager and the substitution service is using time based sliding window; the peak call rate is 200 TPS; the prediction time window (t) is 10 seconds; and the measured 99th percentile reliability (Rc) is 0.92. Based on these metric values, the upper bound on the circuit breaker threshold can be computed as:

$$X = -\frac{(200*60)*\log_e(0.92)}{10} = 100$$

This means that any more than 100 failures in the prediction window will bring down the reliability less than Rc=0.92. Hence, the circuit breaker would need to trip at 100 failures for the 10-second period. In some embodiments, the failure threshold percentage is equal to $$\frac{X*100}{N*t} = 10000/2000 = 5.$$

This interaction is not overly critical in the order drop flow, such that the observed and empirical reliability may be considered as sufficient for circuit breaker calculation.

In a second exemplary use case, an enrichment manager calls an item query service. This is a highly business critical integration, without which picking is extremely inefficient and can cause delays in order delivery and bad associate and customer experience. A fallback planned may use stale location information. In some embodiments, the total minute windows under observation is equal to 24*60=1440; the circuit breaker between the enrichment manager and the item query service is using time based sliding window; the peak call rate is 1800 TPS; the prediction time window (t) is 10 seconds; and the measured $99^{th}$ percentile reliability (Rc) is 0.96. Based on these metric values, the upper bound on the circuit breaker threshold (with empirical reliability of 0.96) can be computed as $$X = -\frac{(1800*60)*\log_e(0.96)}{10} = 440$$

Given the criticality of this interaction, and to avoid keeping threads busy for longer duration, one can choose a desired reliability of 0.99 which gives X as $$X = -\frac{(1800*60)*\log_e(0.99)}{10} = 108$$

This yields a failure threshold percentage of 0.6. Thus the criticality of the interaction and the reliability desired can determine the eventual threshold for failure tolerance.

In a third exemplary use case, a fulfillment order service heavily depends on an elastic search service for all the search queries it fulfills. One can choose a high reliability score of 0.99 for this interaction as the fulfillment order service can go to the secondary region to fulfill the requests in the absence of primary being able to do so, which can ensure no impact to requests from staging, dispense and other fulfill components. In some embodiments, the total minute windows under observation is equal to 24*60=1440; the circuit breaker between the fulfillment order service and the elastic search service is using time based sliding window; the peak call rate is 750 TPS; the prediction time window (t) is 10 seconds; and the measured $99^{th}$ percentile reliability (Rc) is 0.99. Based on these metric values, the upper bound on the circuit breaker threshold can be computed as $$X = -\frac{(750*60)*\log_e(0.99)}{10} = 45$$

This also yields a very aggressive threshold of 0.6% to ensure continuity of business.

In a fourth exemplary use case, during the picking of an order by the store associate, the picking service calls a rule service to ensure compliance of rules for manual substitutions. The number of calls may be very sporadic in nature and generally do not exceed 5 calls in a second. In some embodiments, the system uses a count based sliding window and a measurement period which equals the lowest time window covering all traffic variations (with 0 traffic excluded). For this use case with low volume, a 6-hour traffic may be measured to cover the variations. In some embodiments, the circuit breaker between the picking service and the rule service is using count based sliding window; the peak call rate is 2000 TPS; and the measured $99^{th}$ percentile reliability (Rc) is 0.91. Based on these metric values, the upper bound on the circuit breaker threshold can be computed as $$X = 2000*\log_e(0.9) = 158$$

This roughly gives a threshold of 10% failures for the circuit breaker to tolerate.

One systematic way to measure the effectiveness of a circuit breaker is to compare application threads getting stuck causing internal and external queue buildup. Some experiments showed that the lag remained in control with the disclosed method even though the TPS increased, whereas the lag kept growing exponentially with an old method since threads were stuck longer, making calls to a flapping service thereby reducing effective throughput and causing a bigger pileup.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A first computing device, comprising:
   a non-transitory memory having instructions stored thereon; and
   at least one processor operatively coupled to the non-transitory memory, and configured to read the instructions to:
   configure a circuit breaker between the first computing device and a second computing device, wherein the circuit breaker is configured based on:
      measuring an integration reliability of interaction between a first service executed at the first computing device and a second service executed at the second computing device during a past time period, wherein the first service is dependent on the second service for execution,
      determining an adaptive threshold for the circuit breaker regarding a first time period based at least partially on the integration reliability; and
   execute the first service based on a request by calling the second service at the second computing device through the circuit breaker, wherein the circuit breaker trips to stop the calling of the second service when a failure rate of interaction between the first service and the second service in the first time period exceeds the adaptive threshold, the failure rate of interaction corresponding to a failure percentage of calls to the second service made in the first time period.

2. The first computing device of claim 1, wherein the circuit breaker is configured to:
   switch from a closed state to an open state when the failure rate exceeds a first adaptive threshold, wherein the circuit breaker in the closed state connects the first service with the second service by passing all calls from the first service to the second service, wherein the circuit breaker in the open state disconnects the first service with the second service by not passing calls from the first service to the second service;
   switch from the open state to a half open state automatically after a predetermined time period, wherein the circuit breaker in the half open state connects the first service with the second service by passing only probe calls from the first service to the second service;
switch from the half open state to the open state when the failure rate exceeds a second adaptive threshold; and
switch from the half open state to the closed state when the failure rate is below or equal to the second adaptive threshold.

3. The first computing device of claim 2, wherein:
the first adaptive threshold and the second adaptive threshold are both equal to the adaptive threshold that is determined based on the integration reliability.

4. The first computing device of claim 2, wherein:
the failure rate is computed based on a failure percentage of calls made per unit time.

5. The first computing device of claim 1, wherein:
the integration reliability is measured based on a complement of a probability of failures of interaction between the first service and the second service during the past time period; and
the probability of failures follows an exponential distribution of time.

6. The first computing device of claim 1, wherein the adaptive threshold is adaptively determined based on at least one of a plurality of factors related to the first service and the second service, and the plurality of factors include business criticality, system availability metric, traffic patterns, or categories of the first service and the second service.

7. The first computing device of claim 1, wherein the adaptive threshold is computed based on a predetermined function of:
a length of the past time period, a length of the first time period, a total number of calls made per unit time during the past time period, and the integration reliability.

8. The first computing device of claim 1, wherein:
when a calling frequency from the first service to the second service is higher than a first threshold, the adaptive threshold is computed based on a predetermined function of: a length of the past time period, a length of the first time period, a total number of calls made per unit time during the past time period, and the integration reliability.

9. The first computing device of claim 1, wherein:
when a calling frequency from the first service to the second service is lower than a second threshold, the adaptive threshold is computed based on a predetermined function of: a total number of calls made per unit time during the past time period, and the integration reliability, wherein the past time period encompasses all traffic variations of callings from the first service to the second service.

10. The first computing device of claim 1, wherein:
the first computing device and the second computing device are deployed in a network on a cloud environment.

11. A method implemented on a first computing device, comprising:
configuring a circuit breaker between the first computing device and a second computing device, wherein the configuring the circuit breaker comprises:
measuring an integration reliability of interaction between a first service executed at the first computing device and a second service executed at the second computing device during a past time period, wherein the first service is dependent on the second service for execution,
determining an adaptive threshold for the circuit breaker regarding a first time period based at least partially on the integration reliability; and
executing the first service based on a request by calling the second service at the second computing device through the circuit breaker, wherein the circuit breaker trips to stop the calling of the second service when a failure rate of interaction between the first service and the second service in the first time period exceeds the adaptive threshold, the failure rate of interaction corresponding to a failure percentage of calls to the second service made in the first time period.

12. The method of claim 11, wherein the circuit breaker is configured to:
switch from a closed state to an open state when the failure rate exceeds a first adaptive threshold, wherein the circuit breaker in the closed state connects the first service with the second service by passing all calls from the first service to the second service, wherein the circuit breaker in the open state disconnects the first service with the second service by not passing calls from the first service to the second service;
switch from the open state to a half open state automatically after a predetermined time period, wherein the circuit breaker in the half open state connects the first service with the second service by passing only probe calls from the first service to the second service;
switch from the half open state to the open state when the failure rate exceeds a second adaptive threshold; and
switch from the half open state to the closed state when the failure rate is below or equal to the second adaptive threshold.

13. The method of claim 12, wherein:
the first adaptive threshold and the second adaptive threshold are both equal to the adaptive threshold that is determined based on the integration reliability.

14. The method of claim 12, wherein:
the failure rate is computed based on a failure percentage of calls made per unit time.

15. The method of claim 11, wherein:
the integration reliability is measured based on a complement of a probability of failures of interaction between the first service and the second service during the past time period.

16. The method of claim 11, wherein the adaptive threshold is adaptively determined based on at least one of a plurality of factors related to the first service and the second service, and the plurality of factors include business criticality, system availability metric, traffic patterns, or categories of the first service and the second service.

17. The method of claim 11, wherein the configuring the circuit breaker further comprises:
when a calling frequency from the first service to the second service is higher than a first threshold, computing the adaptive threshold based on a predetermined function of: a length of the past time period, a length of the first time period, a total number of calls made per unit time during the past time period, and the integration reliability.

18. The method of claim 11, further comprising:
determining a number of failures of interaction between the first service and the second service in the first time period;
determining a total number of calls made between the first service and the second service in the first time period; and determining the failure rate based on the number of failures and the total number of calls.

19. A system, comprising:

a first computing device configured to execute a first service;

a second computing device configured to execute a second service, wherein the first service is dependent on the second service for execution;

a circuit breaker between the first computing device and the second computing device, wherein the first computing device is further configured to:

configure the circuit breaker based on:

measuring an integration reliability of interaction between the first service and the second service during a past time period, determining an adaptive threshold for the circuit breaker regarding a first time period based at least partially on the integration reliability; and execute the first service based on a request by calling the second service at the second computing device through the circuit breaker, wherein the circuit breaker is configured to trip to stop the calling of the second service when a failure rate of interaction between the first service and the second service in the first time period exceeds the adaptive threshold, the failure rate of interaction corresponding to a failure percentage of calls made to the second service in the first time period.

20. The system of claim 19, wherein:

the first service and the second service are deployed into a service mesh on a cloud environment.

\* \* \* \* \*